United States Patent [19]

Starbard

[11] 4,078,438
[45] Mar. 14, 1978

[54] POWER TRANSMISSION UNIT

[76] Inventor: Raymond E. Starbard, P.O. Box 825, Vacaville, Calif. 95688

[21] Appl. No.: 696,516

[22] Filed: Jun. 16, 1976

[51] Int. Cl.² .................... F16H 19/04; F16H 37/00
[52] U.S. Cl. ............................................. 74/34; 74/13
[58] Field of Search ................... 74/34, 13; 320/61

[56] References Cited
U.S. PATENT DOCUMENTS 3,981,204  9/1976  Starbard .................................. 74/34

Primary Examiner—Benjamin W. Wyche
Assistant Examiner—Wesley S. Ratliff, Jr.
Attorney, Agent, or Firm—Blair & Brown

[57] ABSTRACT

A power transmission unit which translates reciprocating motion to one-way rotary motion through a rack and drive gears connected through one-way clutches to a gear train.

1 Claim, 5 Drawing Figures

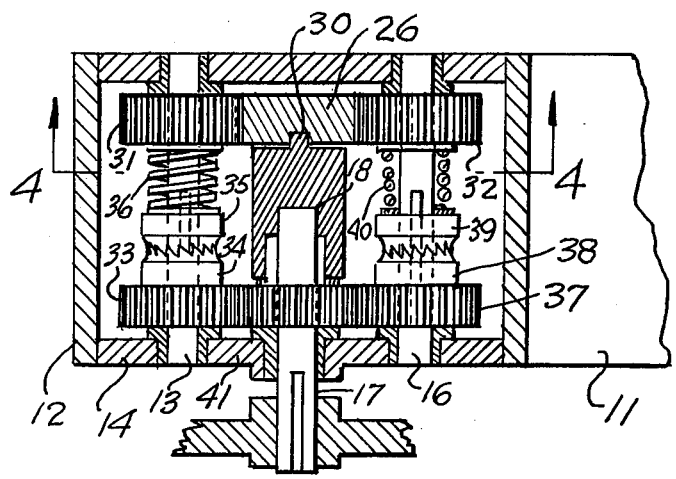
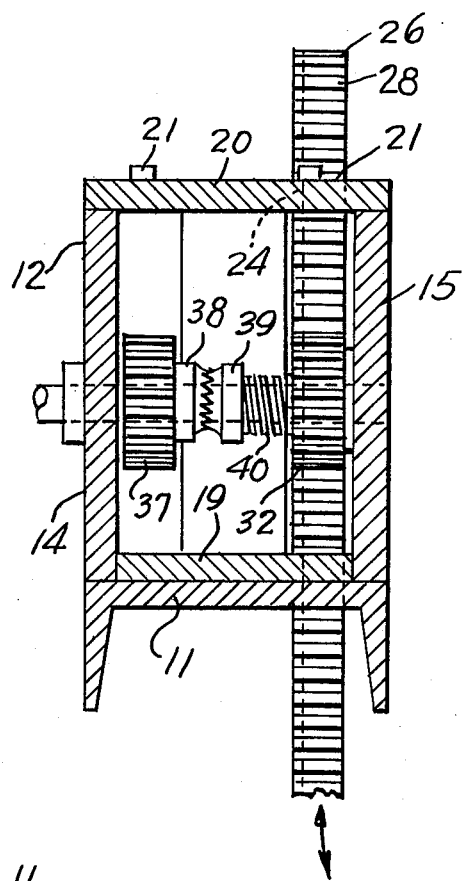
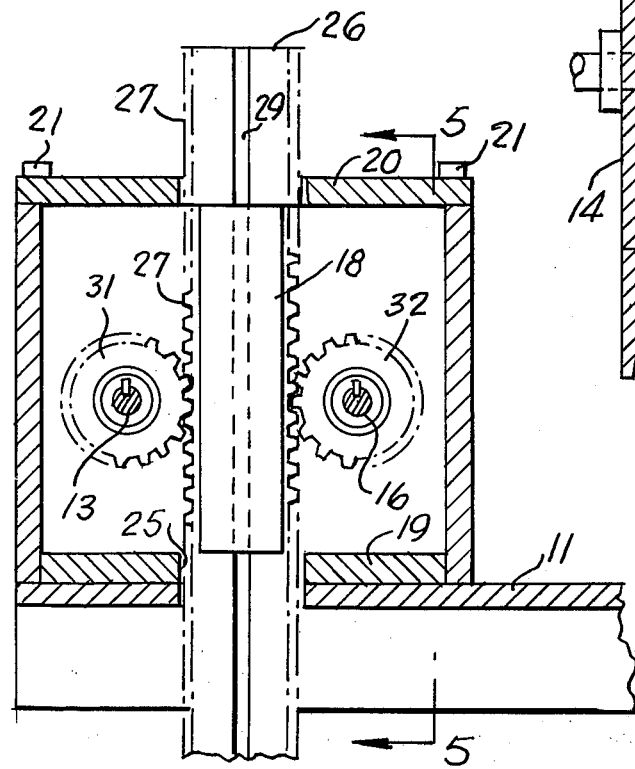

POWER TRANSMISSION UNIT

BACKGROUND OF THE INVENTION

1. Field of the Invention

The present invention relates to power transmission units for translating reciprocating to rotary motion.

2. Summary of the Invention

In the power transmission unit of the instant invention a bar having rack teeth on opposite sides thereof is provided for vertical reciprocation and is attached to any vertically reciprocating device. Gears are meshed with rack teeth on opposite sides of the rack bar so as to be rotated as the rack bar reciprocates. The gears are connected through oppositely arranged one-way clutches so as to alternately drive a single gear in one direction only. The single gear is connected through a gear train and/or belts to power any device.

The primary object of the invention is to provide a power transmission for translating reciprocating to rotary motion.

Other objects and advantages will become apparent in the following specification when considered in light of the attached drawings.

BRIEF DESCRIPTION OF THE DRAWINGS

FIG. 3 is a fragmentary horizontal sectional view taken along the line 3—3 of FIG. 2, looking in the direction of the arrows;

FIG. 4 is a fragmentary vertical sectional view taken along the line 4—4 of FIG. 3, looking in the direction of the arrows; and FIG. 5 is a fragmentary transverse vertical sectional view taken along the line 5—5 of FIG. 4, looking in the direction of the arrows.

DESCRIPTION OF THE PREFERRED EMBODIMENT

Figure 1:
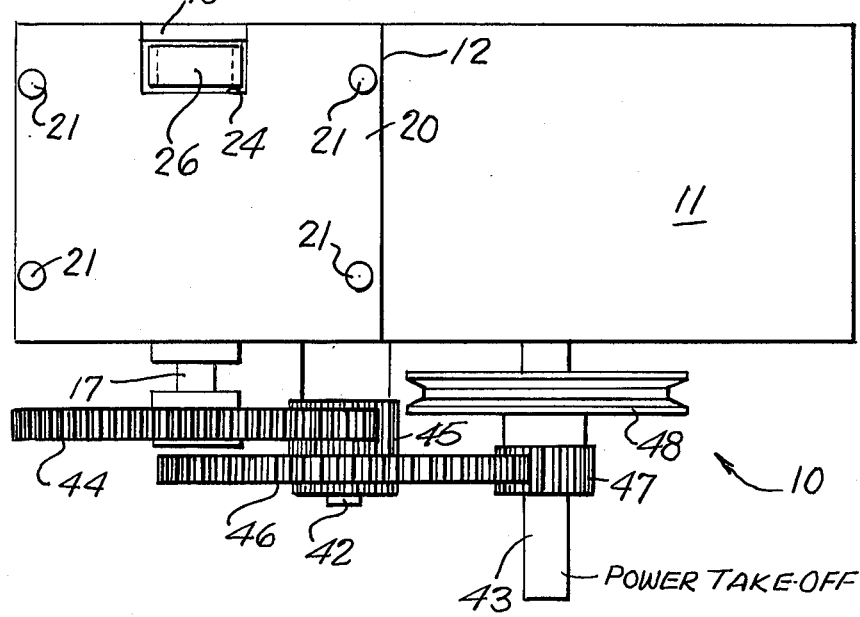
FIG. 1 is a top plan view of the invention.
Figure 2:
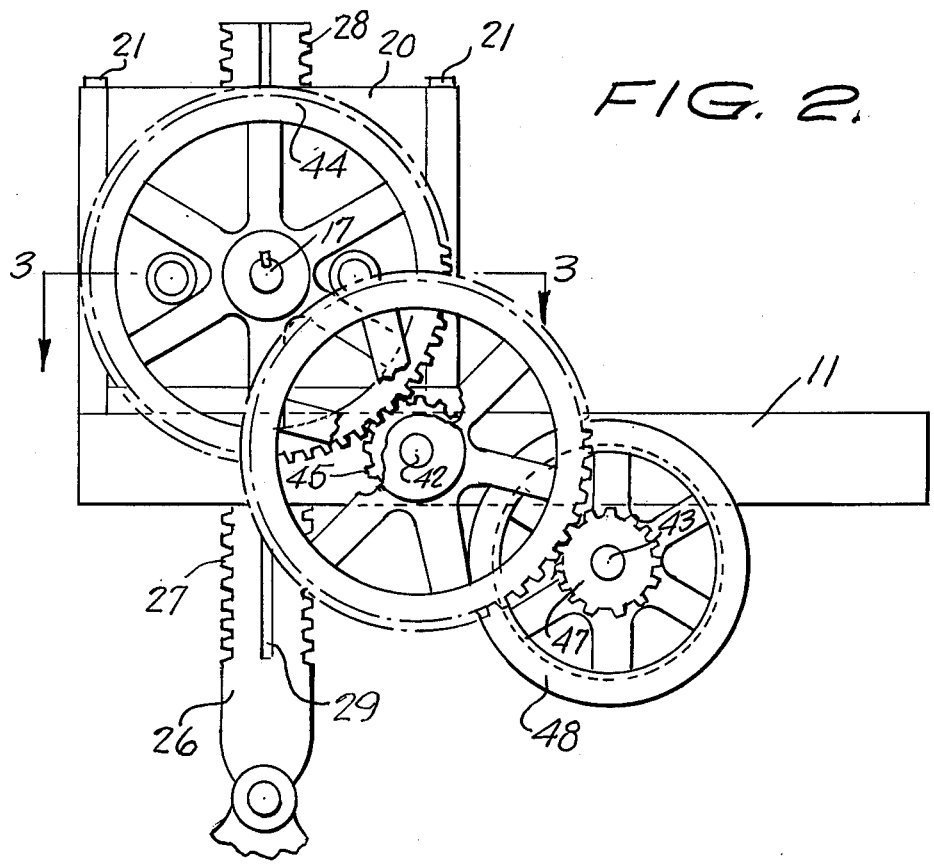
FIG. 2 is a side elevation of the invention shown partially broken away for convenience of illustration.

Referring now to the drawings in detail, wherein like reference characters indicate like parts throughout the several figures, the reference numeral 10 indicates generally a power transmission unit constructed in accordance with the invention.

The power transmission unit 10 includes a channel shaped base member 11. A generally rectangular housing 12 is secured to the base member 11 and extends upwardly therefrom. A shaft 13 is journalled in the front wall 14 of the housing 12 at one end and in the rear wall 15 at its opposite end. A shaft 16 is arranged parallel to the shaft 13 and is similarly journalled in the front wall 14 and rear wall 15. A shaft 17 is journalled in the front wall 14 and in a block 18 secured to the bottom wall 19 of the housing 12. The housing 12 has a top wall 20 secured by studs 21 to the side walls 22, 23 of the housing 12. A rectangular opening 24 extends through the top wall 21 adjacent the rear wall 15 and a rectangular opening 25 extends through the bottom wall 19 and the channel 11 adjacent the rear wall 15 in aligned relation to the opening 24.

A generally rectangular rack bar 26 having rack teeth 27 on one side thereof and rack teeth 28 on the opposite side thereof, is mounted for vertical reciprocation through the openings 24, 25 as can be clearly seen in FIGS. 3 and 4. An upright slot 29 is formed in the forward face of the rack bar 26 and engages over a tongue 30 on the block 18 in the housing 12.

A gear 31 is keyed for the shaft 13 and meshes with the rack teeth 27 on the bar 26. A second gear 32 is keyed to the shaft 16 and meshes with the rack teeth 28 of the bar 26. A gear 33 is journalled on the shaft 13 and is secured to one-way clutch element 34 also journalled on the shaft 13. A second one-way clutch element 35 is keyed to the shaft 13 and is held in engagement with the one-way clutch element 34 by means of a coil spring 36 encompassing the shaft 13 and extending between the gear 31 and the one-way clutch element 35.

A gear 37 is journalled on the shaft 16 and is rigidly secured to a one-way clutch element 38 also journalled on the shaft 16. A one-way clutch element 39 is keyed to the shaft 16 and is held in engagement with the one-way clutch element 38 by means of a coil spring 40 encompassing the shaft 16 and extending between the gear 32 and the one-way clutch element 39. The one-way clutch elements 35, 39 are mounted for endwise sliding movement on the shafts 13, 16 respectively.

A gear 41 is secured to the shaft 17 intermediate the gears 33, 37 and meshing with the gears 33, 37 to be driven thereby. A shaft 42 is rigidly mounted to the base member 11 and a power take-off shaft 43 is also rigidly mounted to the base 11 in parallel relation to the shafts 42 and 17. A relatively large spur gear 44 is fixed to the shaft 17 and meshes with a relatively small spur gear 45 journalled on the shaft 42 and rigidly secured to a relatively large spur gear 46. A relatively small spur gear 47 is journalled on the shaft 43 and meshes with the spur gear 46. A V-pulley 48 is fixed to the spur gear 47 to revolve therewith.

In the use and operation of the invention the unit 10 is secured in any desired manner with the lower end of the rack bar 26 connected to any vertically reciprocatable device (not shown), to thus cause the rack bar to reciprocate with respect to the housing 12. As the rack bar reciprocates the rack teeth 27 rotate the spur gear 21 and the rack teeth 28 rotate the spur gear 32. As the rack bar moves downwardly with respect to the housing 12, the gear 31 as seen in FIG. 4 rotates in a clockwise direction to thus rotate the one-way clutch element 35 in a clockwise direction driving the one-way clutch element 34 and the gear 33 in a clockwise direction so as to turn the shaft 17 in a counter clockwise direction. As the rack bar 26 reverses its direction and moves upwardly with respect to the housing 12, the one-way clutch elements 34, 35 slip by each other so that no drive occurs to the gear 33. The gear 32 is then rotated in a clockwise direction and through the one-way clutch elements 38, 39 rotates the gear 37 in a clockwise direction to thus rotate the shaft 17 in a counter clockwise direction. The one-way elements 38, 39 slip by each other when the gear 32 is rotated in a counter clockwise direction during downward movement of the rack bar 26 with respect to the housing 12.

The shaft 17 is thus rotated solely in a counter clockwise direction by alternate driving connections to opposite sides of the rack bar 26. The gears 44, 45, 46 and 47 provide a relatively high speed rotary power drive.

Having thus described the preferred embodiment of the invention it should be understood that numerous structural modifications and adaptations may be resorted to without departing from the spirit of the invention.

What is claimed is:

1. A power transmission unit for translating reciprocating to rotary motion comprising a housing, a rack bar mounted for vertical sliding movement vertically through said housing, said rack bar having rack teeth formed on diametrically opposed sides thereof, means in said housing guiding said rack bar in its vertical reciprocation, a pair of parallel shafts journalled in said housing on opposite sides of said rack bar, a gear secured to each of said shafts and meshing with the rack teeth on opposite sides of said rack bar, a one-way clutch mounted on each of said shafts, a spur gear mounted for rotation on each of said shafts rotatably driven by one of said one-way clutches, a third shaft journalled in said housing and extending outwardly therefrom, a spur gear secured to said third shaft and meshing with the gears on said parallel shafts, a base supporting said housing, a gear train mounted on said last named shaft and said base, and means driven by said gear train providing a rotary power take-off.

* * * * *

UNITED STATES PATENT OFFICE
CERTIFICATE OF CORRECTION

Patent No. 4,078,438             Dated     March 14, 1978

Inventor(s) Raymond E. Starbard

It is certified that error appears in the above-identified patent and that said Letters Patent are hereby corrected as shown below:

On the Title page insert

--/*/ Notice: The term of this patent subsequent to September 21, 1993, has been disclaimed --

Signed and Sealed this

Seventh Day of November 1978

[SEAL]

Attest:

RUTH C. MASON  
*Attesting Officer*

DONALD W. BANNER  
*Commissioner of Patents and Trademarks*